UNITED STATES PATENT OFFICE.

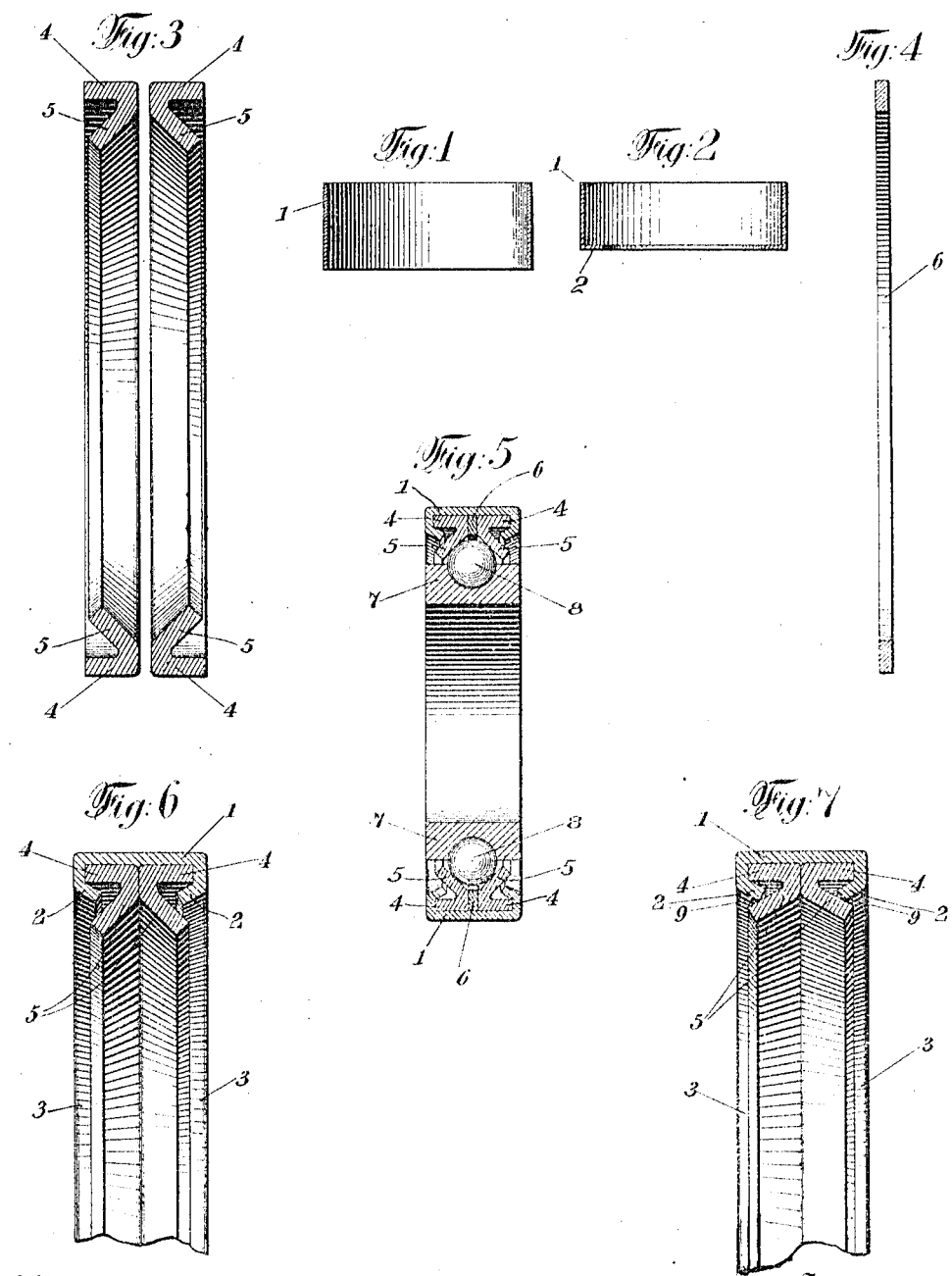

JOHN W. SCHATZ, OF POUGHKEEPSIE, NEW YORK, ASSIGNOR OF ONE-THIRD TO HERMAN A. SCHATZ AND ONE-THIRD TO GROVER H. SCHATZ, BOTH OF POUGHKEEPSIE, NEW YORK.

ANNULAR BALL-BEARING.

1,073,529.  Specification of Letters Patent.  Patented Sept. 16, 1913.

Application filed September 7, 1912. Serial No. 719,044.

*To all whom it may concern:*

Be it known that I, JOHN W. SCHATZ, a citizen of the United States, and a resident of the city of Poughkeepsie, county of Dutchess, State of New York, have invented certain new and useful Improvements in Annular Ball-Bearings, of which the following is a full, clear, and exact description, reference being had to the accompanying drawings.

Ball bearings of the annular form as heretofore made have necessarily been expensive because of the amount and exactness of the machine work required for their construction. It is the purpose of this invention, therefore, to so construct the parts of such bearings that when assembled, a bearing of great strength and perfection will be secured at very greatly reduced cost, and the tools for the construction of the parts being once in hand, large numbers of them may be produced in a fraction of the time required to produce them by present methods.

Referring to the drawings, Figure 1 illustrates a sectional view of one form of blank from which the jacket of the bearing is made; Fig. 2 illustrates a sectional view of a partly formed jacket made from the blank shown in Fig. 1; Fig. 3 illustrates a sectional view of one form of the angle rings which when assembled with the other parts constitute the cup or raceway of the bearing; Fig. 4 illustrates a view similar to Fig. 3, of an annular washer used to separate the two angle rings of the cup when adjustment thereof is desired; Fig. 5 illustrates a sectional view of a bearing embodying the invention, all the parts being assembled; Fig. 6 illustrates a sectional view of a bearing embodying the invention, the washer being omitted; Fig. 7 illustrates a view similar to Fig. 6 showing a modified construction in which the turned in edges of the jacket are made to engage with and thus reinforce the angular members of the cup.

The figures of the drawings are not all on the same scale. Figs. 1, 2 and 5 differ from the others.

In the drawings, 1 represents a blank resembling a short section of steel tubing. It is preferably drawn up from flat stock into the form shown and is of such diameter and of such length as will make the jacket, as I call the part, for a given bearing, and during the drawing up operation, or subsequently, as the case may be, a flange 2, (see Fig. 2) is turned inwardly thereon at one end. 5, 5 are two angular rings which are to constitute the cup or outer raceway (hereinafter called the cup) of the bearing. In the first instance they are simple steel rings having an exterior diameter such as will snugly fit in the jacket shown in Fig. 2. They are then by the action of suitable dies turned over and made to assume the circumferentially extending angular form shown, each having one member 4 parallel with the axis of the bearing and another member 5 at an angle of 45 degrees or thereabout thereto. After they are formed they are case hardened.

6 is a steel washer having substantially the same exterior diameter as that of the angular rings and of such thickness as desired.

7 is the cone, collar or sleeve, as the case may be, which contains the other or inner half of the raceway in which the balls run. It of course is attached to or forms part of the shaft, axle, or other structure which is to be equipped with the bearing.

8 are the balls.

The structure as thus far described is assembled as follows: One of the angular rings with a washer of the desired thickness, if such washer is desired, is dropped into the partly formed jacket illustrated in Fig. 2. The cone 7, or its equivalent, is then placed in the center of the jacket. The balls are then loaded into the bearing between the cone and the angular ring which is then in place. The other angular ring is then dropped into the jacket, whereby the balls and the cone, or its equivalent, will be suitably sustained. All these parts are then subjected to the action of suitable crimping dies, whereby the edges of the jacket are folded or inwardly as illustrated and caused to embrace and rigidly hold all the parts permanently in place. The inwardly crimped edges 2 of the jacket materially aid in strengthening the structure and holding the cups very firmly in position, preventing any possibility of the balls forcing them outwardly or separating them under the pressures to which they are incident in use. The washer, or if greater separation is desired, then two or more of them, are used for the purpose of separating the cup rings, thus permitting the use of balls of different size without increasing the total diameter of the bearing and also permitting the same angle of the member 5, to wit, 45 degrees, or thereabout, to be retained, and also the same distance between the centers of the balls. Obviously the washers may vary in thickness as the size of the balls varies.

It may sometimes happen that a bearing is to be equipped with balls of such size or the diameter of the bearing may be such that there will be no necessity for any washer at all, in which event the angle rings composing the cup will be brought close together, so that they abut against each other, as shown in Fig. 6. Also since these bearings are made in many sizes and for many different uses, some of them requiring unusual strength, I sometimes reinforce the angle member 5 of the cup rings by so proportioning the jacket that its turned in edges shall, during the crimping operation, be brought in contact with the outer surfaces of the members 5 as shown at 9 in Fig. 7, thus acting as braces for them.

Those who are familiar with such matters will at once understand that many departures may be made from the details of construction described and illustrated by me and still the essentials of the invention be retained. For instance, the cup rings or sections may be turned up from solid bar metal, also the jacket in some cases need not be made to entirely lap around the edges of the cup sections, but simply to lap on to them sufficiently to prevent their separation. I prefer the construction shown, however. Although the forming dies will in many cases make the bearings so accurately that no additional machine work will be necessary, still for special uses some slight and relatively inexpensive machine work may be desirable, especially if the bearings are standardized and must be interchangeably used.

Although I have illustrated my invention as applied to an outer bearing having an inward presentation, clearly the reverse form will be produced by a mere reversal of the parts, so that they shall have an outward presentation. In short, although I shall herein claim certain of the details of construction described and illustrated above, because they are, as I believe, new and I know them to be useful, yet I believe my invention to be broader than such details and I shall therefore also claim it thus broadly.

I claim:

1. As a new article of manufacture, a complete, self-contained and self-supporting ball bearing unit having two cup rings made of sheet metal, each having a member parallel with the axis of the bearings and another member at an angle thereto arranged side by side, a sheet metal jacket which extends across the said parallel members, its sides being crimped about the outer edges of said parallel members, the edges of said sides being turned inwardly to stiffen the jacket, an interior bearing or cone, and balls between the cup rings and the cone.

2. As a new article of manufacture, a bearing having two cup rings made of sheet metal, each having a member parallel with the axis of the bearing and another member at an angle thereto arranged side by side, a sheet metal jacket which embraces and confines the cup rings, the edges of said jacket being crimped about the edges of the parallel members of the rings and extended to and adapted to brace the angular members of said rings, an interior bearing or cone and balls between the cup rings and the cone.

3. As a new article of manufacture, a bearing having two cup rings made of sheet metal, each having a member parallel with the axis of the bearing and another member at an angle thereto arranged side by side, a parallel sided washer between the meeting edges of said rings, a sheet metal jacket which surrounds said rings, the edges of which jacket are crimped about the outer edges of the parallel members and extend to and are adapted to brace the angular members of the rings, an interior bearing or cone, and balls between the cup rings and the cone.

In testimony whereof I have signed my name to this specification in the presence of two subscribing witnesses.

JOHN W. SCHATZ.

Witnesses:
E. E. PERKINS,
EDWIN R. PEASE.